United States Patent
Sakamoto et al.

(10) Patent No.: US 10,295,803 B2
(45) Date of Patent: May 21, 2019

(54) ZOOM LENS AND IMAGE PICKUP APPARATUS HAVING THE SAME

(71) Applicant: CANON KABUSHIKI KAISHA, Tokyo (JP)

(72) Inventors: Masaru Sakamoto, Utsunomiya (JP); Masakazu Kodaira, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/819,115

(22) Filed: Nov. 21, 2017

(65) Prior Publication Data

US 2018/0143412 A1    May 24, 2018

(30) Foreign Application Priority Data

Nov. 24, 2016 (JP) .................................. 2016-227543

(51) Int. Cl.
G02B 15/17    (2006.01)
G02B 15/163   (2006.01)
G02B 15/20    (2006.01)

(52) U.S. Cl.
CPC ........... *G02B 15/163* (2013.01); *G02B 15/17* (2013.01); *G02B 15/20* (2013.01)

(58) Field of Classification Search
CPC ....... G02B 15/163; G02B 15/17; G02B 15/20
USPC ......................................... 359/676, 684, 689
See application file for complete search history.

(56) References Cited

U.S. PATENT DOCUMENTS

| 5,572,276 | A  | * | 11/1996 | Hirakawa ............ G02B 15/173 359/684 |
| 9,417,440 | B2 |   | 8/2016  | Sakamoto |
| 9,588,323 | B2 |   | 3/2017  | Tatenuma et al. |
| 9,739,988 | B2 |   | 8/2017  | Sakamoto |
| 2013/0194484 | A1 |   | 8/2013  | Sakamoto |
| 2014/0049672 | A1 | * | 2/2014  | Sakamoto .............. G02B 15/14 348/294 |

(Continued)

FOREIGN PATENT DOCUMENTS

| JP | 2011-081063 A | 4/2011 |
| JP | 2014-215586 A | 11/2014 |
| JP | 5841270 B2    | 1/2016 |

OTHER PUBLICATIONS

European Search Report dated Mar. 8, 2018 in corresponding European Patent Application No. 17001908.7, 8 pages.

*Primary Examiner* — James R Greece
(74) *Attorney, Agent, or Firm* — Carter, DeLuca & Farrell LLP (57) ABSTRACT

A zoom lens includes, in order from the object side, a first lens unit having a positive refractive power that does not move for zooming, second to fourth lens units each having a negative refractive power that moves for zooming, and a relay lens unit having a positive refractive power and being closest to the image side that does not move for zooming. The second lens unit moves to the image side from the wide-angle end to the telephoto end. When a focal length fx determined by a focal length fw of the zoom lens at the wide-angle end and a zoom ratio Z is $fx = fw \times Z^{0.38}$, the zoom lens satisfies $0.05 < L2\,min/L2w < 0.98$, where L2 min is a minimum distance between the second and third lens units in a zoom range from the wide-angle end to the focal length fx, and L2w is a distance between them at the wide-angle end.

8 Claims, 7 Drawing Sheets

(56) References Cited

U.S. PATENT DOCUMENTS

2014/0153108 A1 6/2014 Ikeda et al.
2015/0301319 A1 10/2015 Komatsu et al.
2016/0124199 A1 5/2016 Sanjo et al.

* cited by examiner

ZOOM LENS AND IMAGE PICKUP APPARATUS HAVING THE SAME

BACKGROUND OF THE INVENTION

Field of the Invention

The present invention relates to a zoom lens advantageous for use in a television camera, a video camera, a photographic camera, or a digital camera, and relates to a zoom lens achieving a wide angle of view, a high zoom ratio, and size and weight reduction.

Description of the Related Art

Conventionally, four-unit zoom lenses are often used as zoom lenses for television cameras because it is relatively easy to achieve a wide angle of view, a high zoom ratio, and size and weight reduction. Such a four-unit zoom lens includes, in order from the object side, a first lens unit having a positive refractive power that does not move for zooming, a second lens unit having a negative refractive power that moves during zooming, a third lens unit for correcting variation in the image plane caused by zooming, and a fourth lens unit having a positive refractive power for imaging.

In recent years, there have been proposed zoom lenses for television cameras including three, four, or more movable units as zooming units with functions as a variator and a compensator.

For example, Japanese Patent No. 5841270 and Japanese Patent Application Laid-Open No. 2011-81063 each propose a zoom lens including a first lens unit having a positive refractive power, a second lens unit having a negative refractive power that moves during zooming, a third lens unit having a negative refractive power that moves during zooming, and a fourth lens unit having a negative refractive power that moves during zooming.

In order for a conventional four-unit zoom lens for a television camera to achieve a wider angle of view, a higher zoom ratio, and further size and weight reduction at the same time, the refractive power of each unit needs to be increased, and this causes a problem where variation in aberrations increases. In particular, when aberration correction is performed at the wide-angle end and the telephoto end, variation in aberrations increases in the focal length range (fw×$Z^{0.05}$ to fw×$Z^{0.35}$) between the wide-angle end and a zoom middle position (fw×$Z^{0.5}$), and large performance degradation occurs in the periphery of the field.

In Japanese Patent No. 5841270 and Japanese Patent Application Laid-Open No. 2011-81063, the three or four zooming units move along different loci during zooming from the wide-angle end to the telephoto end. However, Japanese Patent No. 5841270 or Japanese Patent Application Laid-Open No. 2011-81063 does not disclose zooming loci for the focal length range (fw×$Z^{0.05}$ to fw×$Z^{0.35}$) from the wide-angle end to the zoom middle position where aberrations increase, or does not achieve effective aberration correction.

SUMMARY OF THE INVENTION

Thus, the present invention has an objective to provide a zoom lens including three or more movable units as its zooming units and simultaneously achieving a wide angle of view, a high zooming ratio, size and weight reduction, and particularly high performance in the focal length range from the wide-angle end to the zoom middle position. The present invention also aims to provide an image pickup apparatus having such a zoom lens.

To attain the above objective, a zoom lens according to the present invention includes, in order from an object side to an image side, a first lens unit having a positive refractive power that does not move for zooming, a second lens unit having a negative refractive power that moves during zooming, a third lens unit having a negative refractive power that moves during zooming, a fourth lens unit having a negative refractive power that moves during zooming, and a relay lens unit having a positive refractive power and being located closest to the image side that does not move for zooming. The second lens unit moves to the image side from a wide-angle end to a telephoto end. When a focal length fx determined based on a focal length fw of the zoom lens at the wide-angle end and a zoom ratio Z is fx=fw×$Z^{0.38}$, the zoom lens satisfies 0.05<L2 min/L2w<0.98, where L2 min is a minimum distance between the second lens unit and the third lens unit in a zoom range from the wide-angle end to the focal length fx, and L2w is a distance between the second lens unit and the third lens unit at the wide-angle end.

Further features of the present invention will become apparent from the following description of exemplary embodiments with reference to the attached drawings.

The present invention can obtain a zoom lens which achieves not only favorable optical performance but also a wide angle of view, a high power, size and weight reduction, and high performance, by appropriately setting the moving loci of the second lens unit and the third lens unit and the power arrangement of the units.

DESCRIPTION OF THE EMBODIMENTS

Preferred embodiments of the present invention will now be described in detail in accordance with the accompanying drawings.

A zoom lens of the present invention includes, in order from the object side to the image side, a first lens unit U1 having a positive refractive power that does not move for zooming, a second lens unit U2 having a negative refractive power that moves during zooming, a third lens unit U3 having a negative refractive power that moves during zooming, and a fourth lens unit U4 having a negative refractive power that moves during zooming, and further includes, at a position closest to the image side, a relay lens unit UR having a positive refractive power that does not move for zooming. The second lens unit U2 moves to the image side from the wide-angle end to the telephoto end. The borders of a lens unit as referred to herein are defined by optical surfaces the distance between each of which and its adjacent optical surface changes upon zooming.

In a conventional four-unit zoom lens, the locus along which the third lens unit moves is uniquely determined for image point correction. Specifically, during zooming from the wide-angle end to the telephoto end, the third lens unit moves along a locus convex to the object side (moves first to the object side and then to the image side), and is located closest to the object side at a zoom position where the imaging magnification of the second lens unit passes −1.

Since the zooming lens of the preset invention includes three or more movable units as its zooming units, any moving locus can be set for the second lens unit U2 and the third lens unit U3.

Specifically, the zoom range between the wide-angle end and a focal length fx (=fw×$Z^{0.38}$ where fw is the focal length of the zoom lens at the wide-angle end and Z is a zoom ratio) includes a zoom position at which the distance between the second lens unit U2 and the third lens unit U3 is narrower than at the wide-angle end. Thus, the difference in the height between off-axial rays through the second lens unit U2 and off-axial rays through the third lens unit U3 which increases at the wide-angle end is reduced in this zoom range (between the wide-angle end and the focal length fx). Thereby, field curvature that varies in the undercorrected direction (to the object side) is favorably corrected in the zoom range between the wide-angle end and the focal length fx.

Figure 7:
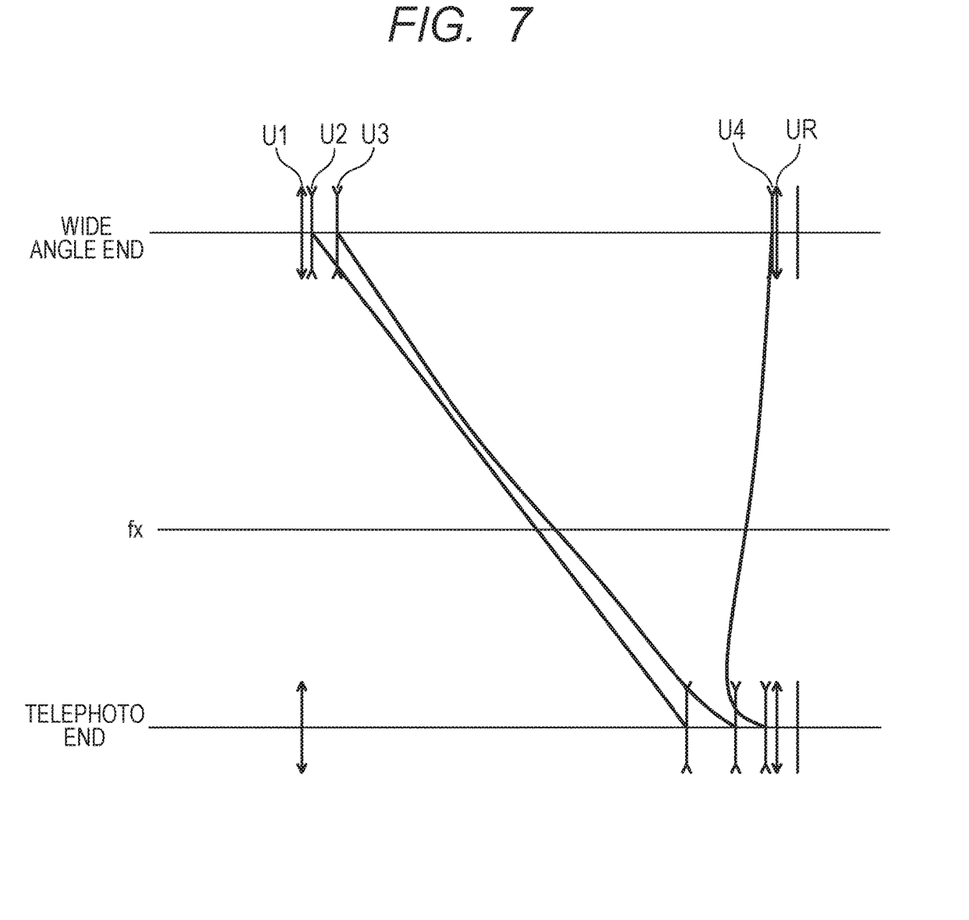
FIG. 7 is a schematic diagram illustrating the principle of the present invention.

FIG. 7 is a diagram illustrating zooming loci in the embodiments of the present invention. The solid lines in the diagram show the loci along which the second lens unit U2, the third lens unit U3, and the fourth lens unit U4 move from the wide-angle end and the telephoto end according to the present invention. In the present invention, the distance between second lens unit U2 and the third lens unit U3 is narrower in the zoom range (between the wide-angle end and the focal length fx) than at the wide-angle end.

With the focal length fx being expressed as $$fx=fw\times Z^{0.38} \quad (1)$$

where fw is the focal length of the zoom lens at the wide-angle end and Z is the zoom ratio, the zoom lens of the present invention satisfies the following condition:

$$0.05 < L2\,min/L2w < 0.98 \quad (2)$$

where L2 min is the minimum distance between the second lens unit U2 and the third lens unit U3 in the zoom range between the wide-angle end and the focal length fx, and L2w is the distance between the second lens unit and the third lens unit at the wide-angle end.

Conditional Expression (2) defines the ratio of the minimum distance between the second lens unit U2 and the third lens unit U3 to the distance therebetween at the wide-angle end. Expression (1) defines the telephoto-end side of the zoom range starting from the wide-angle end, to determine a range, as a population, for identifying a zoom position at which the distance between the second lens unit U2 and the third lens unit U3 is minimum as defined by Condition Expression (2).

If the value of Conditional Expression (2) exceeds its upper limit value, it is difficult to favorably correct the field curvature in the zoom range between the wide-angle end and the focal length fx. If the value of Condition Expression (2) falls below its lower limit value, the distance between the second lens unit U2 and the third lens unit U3 increases at the wide-angle end, and to compensate for this, the need arises to situate the principal point of the first lens unit U1 to the image side. As a result, the refractive power of each single lens in the first lens unit U1 increases, and this in turn increases variation in spherical aberration at the telephoto end and variation in distortion at the wide-angle end, making it difficult to achieve a high power.

More preferably, Expression (1) is set as follows:

$$fx=fw\times Z^{0.35}. \quad (1a)$$

More preferably, Conditional Expression (2) is set as follows:

$$0.08 < L2\,min/L2w < 0.97. \quad (2a)$$

By satisfying the above configurations, the image-pickup optical system of each numerical value embodiment of the present invention achieves not only favorable optical performance, but also a wide angle of view, a high power, and size and weight reduction.

As an additional mode of the present invention, the following Conditional Expression (3) defines the ratio of a focal length f2 of the second lens unit U2 to a focal length f3 of the third lens unit U3:

$$0.1 < |f2/f3| < 4.0. \quad (3)$$

If the value of Condition Expression (3) falls below its lower limit value, the refractive power of the third lens unit U3 is too week relative to that of the second lens unit U2, and a change in the distance between the second lens unit U2 and the third lens unit U3 increases. As a result, the distance between the second lens unit U2 and the third lens unit U3 increases at the wide-angle end, and this in turn increases variation in spherical aberration at the telephoto end and variation in distortion at the wide-angle end, making it difficult to achieve a high power. If the value of Conditional Expression (3) exceeds its upper limit value, the refractive power of the third lens unit U3 is too strong relative to that of the second lens unit U2, and then the sensitivity of the third lens unit U3 to production error increases at the telephoto end. In particular, field curvature and coma increase, lowering productivity.

More preferably, Conditional Expression (3) is set as follows:

$$0.15 < |f2/f3| < 3.0. \quad (3a)$$

As an additional mode of the present invention, the following Conditional Expression (4) defines the ratio of a focal length f1 of the first lens unit U1 to the focal length f2 of the second lens unit U2:

$$1.2 < |f1/f2| < 7.0. \quad (4)$$

If the value of Conditional Expression (4) exceeds its upper limit value, the refractive power of the second lens unit U2 is too strong relative to that of the first lens unit U1, and this increase variation in aberrations, making it difficult to correct them. If the value of Conditional Expression (4) falls below its lower limit value, the refractive power of the second lens unit U2 is too weak relative to that of the first lens unit U1, and the second lens unit U2 has to move longer during zooming, making it difficult to achieve a high power.

More preferably, Conditional Expression (4) is set as follows:

$$1.5<|f1/f2|<6.0. \qquad (4a)$$

Next, characteristics of each numerical value embodiment are described.

Embodiment 1

A zoom lens of Numerical Value Embodiment 1 of the present invention includes, in order from the object side to the image side, a first lens unit U1 having a positive refractive power, a second lens unit U2 for zooming having a negative refractive power, a third lens unit U3 for zooming having a negative refractive power, a fourth lens unit U4 for zooming having a negative refractive power, an aperture stop SP, and a relay lens unit UR for image forming having a positive refractive power. The second lens unit moves to the image side when zooming from the wide-angle end to the telephoto end.

Figure 1:
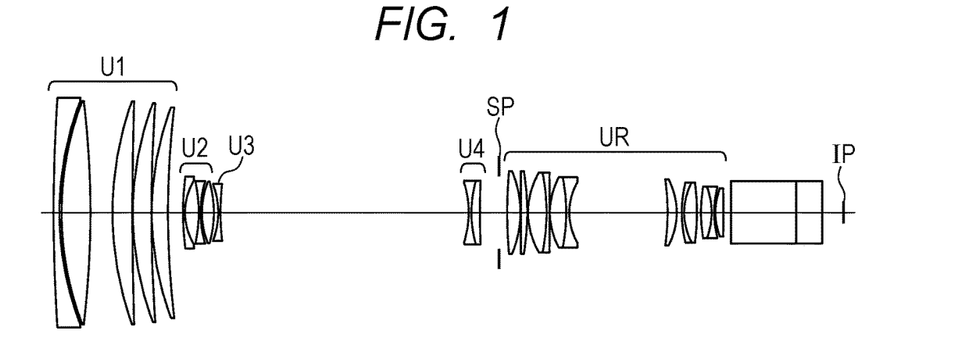
FIG. 1 is a lens sectional diagram of a zoom lens according to Numerical Value Embodiment 1 of the present invention at the wide-angle end, focusing at infinity.
Figure 2A:
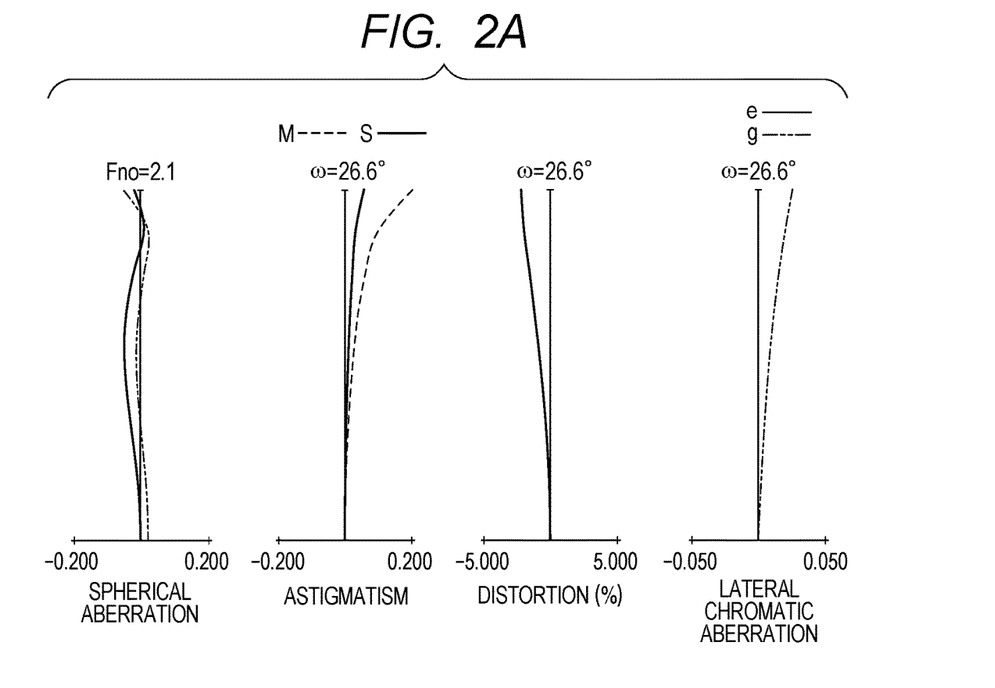
FIG. 2A is an aberration diagram of the zoom lens of Numerical Value Embodiment 1 at the wide-angle end.
Figure 2B:
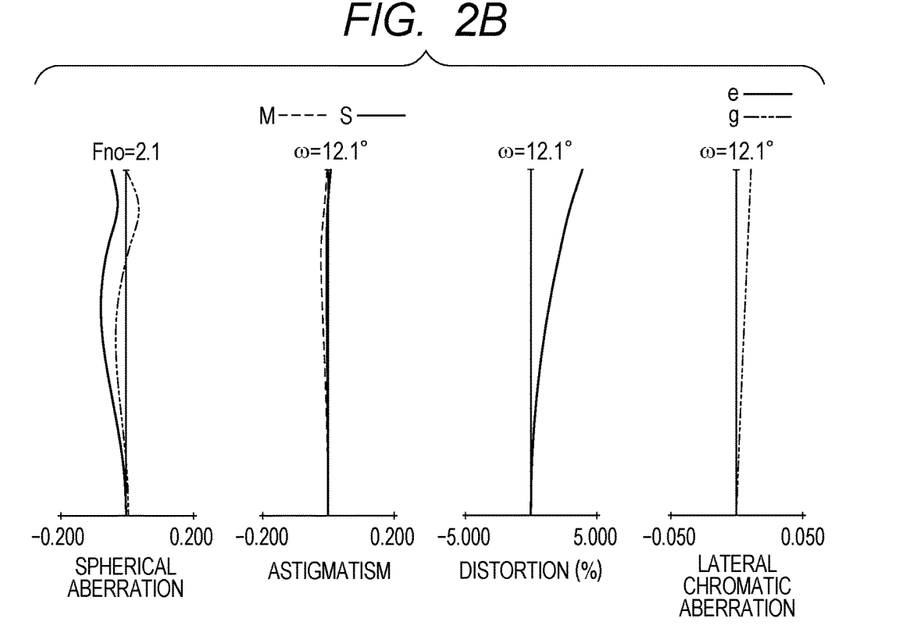
FIG. 2B is an aberration diagram of the zoom lens of Numerical Value Embodiment 1 at a focal length f=25.7 mm.
Figure 2C:
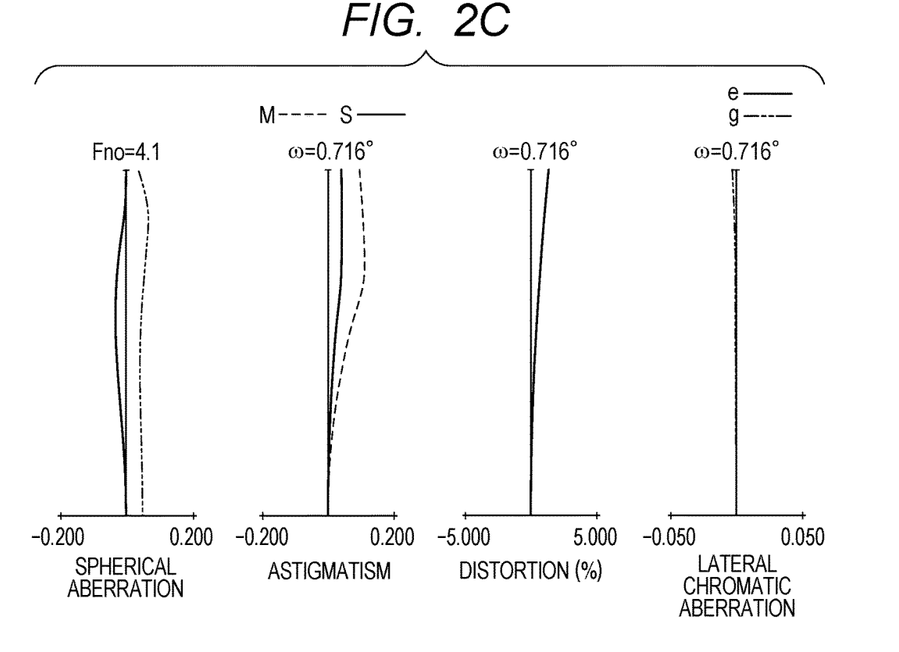
FIG. 2C is an aberration diagram of the zoom lens of Numerical Value Embodiment 1 at the telephoto end.

FIG. 1 is a lens sectional diagram of the zoom lens of Numerical Value Embodiment 1 of the present invention at the wide-angle end, focusing at infinity. The zoom lens of each embodiment is an image pickup optical system for use in an image pickup apparatus. In each lens sectional diagram, the left side is the subject (object) side, and the right side is the image side. FIGS. 2A, 2B, and 2C are aberration diagrams of the zoom lens of Numerical Value Embodiment 1 at the wide-angle end, a focal length f=25.7 mm, and the telephoto end, respectively. Note that the focal length f=25.7 mm is the focal length at which the distance between the second lens unit U2 and the third lens unit U3 is the minimum. In the aberration diagrams of Numerical Value Embodiments 1 to 3, spherical aberration is expressed with e-line and g-line, astigmatism is expressed with a meridional image plane (ΔM) for e-line and a sagittal image plane (ΔS) for e-line, and lateral chromatic aberration is expressed with g-line. Spherical aberration and astigmatism are each expressed on a scale of 0.2 mm, distortion on a scale of 5%, and lateral chromatic aberration on a scale of 0.05 mm. "Fno" denotes an f-number, and "ω" denotes a half angle of view. Further, the wide-angle end and the telephoto end are zoom positions which are the ends of an available zoom range in which the second lens unit U2 for zooming can move on the mechanical optical axis.

The first lens unit U1 has a positive refractive power and does not move for zooming. Part of the first lens unit U1 moves from the image side to the object side for focus adjustment from infinity to finite distance. The second lens unit U2 is a variator lens unit for zooming having a negative refractive power and moving to the image side during zooming from the wide-angle end (short focal distance end) to the telephoto end (long focal distance end). The third lens unit U3 and the fourth lens unit U4 have a negative refractive power and move during zooming. "SP" denotes an aperture stop. The relay lens unit UR does not move for zooming. "IP" is the image plane and corresponds to the image pickup plane of an image pickup element (a photoelectric conversion element such as a CCD or CMOS) that receives light representing an image formed by a lens apparatus.

Next, the lens configuration of each unit in Numerical Value Embodiment 1 is described. It is assumed below that lenses are arranged in order from the object side to the image side. The first lens unit U1 includes a negative lens and four positive lenses. The second lens unit U2 includes a negative lens, a negative lens, and a positive lens. The third lens unit U3 includes a negative lens. The fourth lens unit U4 includes a cemented lens of a negative lens and a positive lens. The relay lens unit UR includes a positive lens, a positive lens, a cemented lens of a positive lens and a negative lens, a cemented lens of a positive lens and a negative lens, a positive lens, a cemented lens of a negative lens and a positive lens, a cemented lens of a positive lens and a negative lens, and a positive lens.

Table 1 shows values of the conditional expressions used for Numerical Value Embodiment 1. Numerical Value Embodiment 1 satisfies Conditional Expressions (2) to (4). Thus, the present invention obtains an image pickup optical system that achieves not only favorable optical performance, but also a wide angle of view, a high power, and size and weight reduction.

Embodiment 2

A zoom lens of Numerical Value Embodiment 2 has the same configuration as that of Embodiment 1, and specifically, includes, in order from the object side to the image side, a first lens unit U1 having a positive refractive power, a second lens unit U2 for zooming having a negative refractive power, a third lens unit U3 for zooming having a negative refractive power, a fourth lens unit U4 for zooming having a negative refractive power, an aperture stop SP, and a relay lens unit UR for image forming having a positive refractive power.

Figure 3:
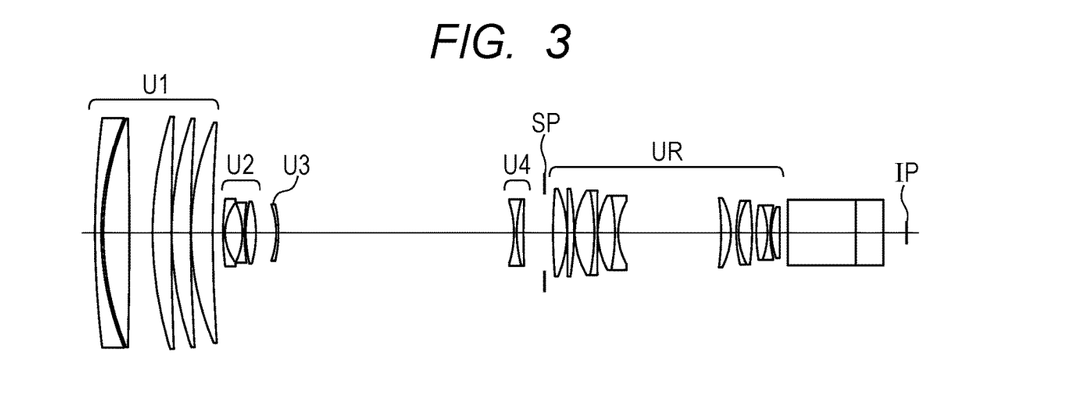
FIG. 3 is a lens sectional diagram of a zoom lens according to Numerical Value Embodiment 2 of the present invention at the wide-angle end, focusing at infinity.

FIG. 3 is a lens sectional diagram of the zoom lens of Numerical Value Embodiment 2 of the present invention at the wide-angle end, focusing at infinity.

Figure 4A:
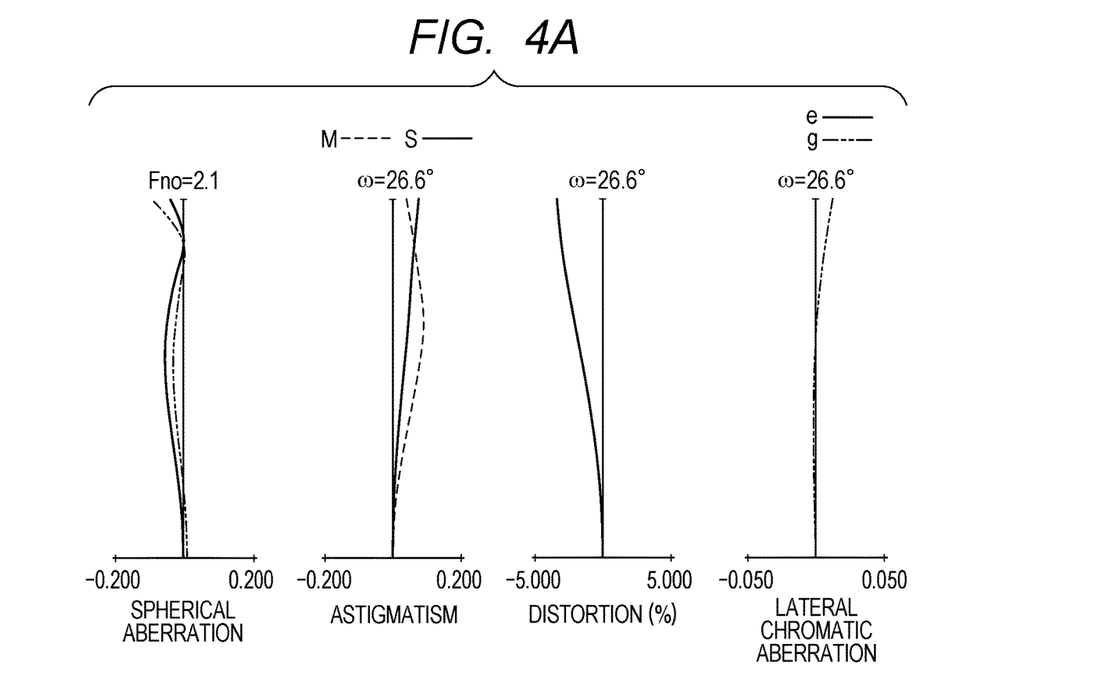
FIG. 4A is an aberration diagram of the zoom lens of Numerical Value Embodiment 2 at the wide-angle end.
Figure 4B:
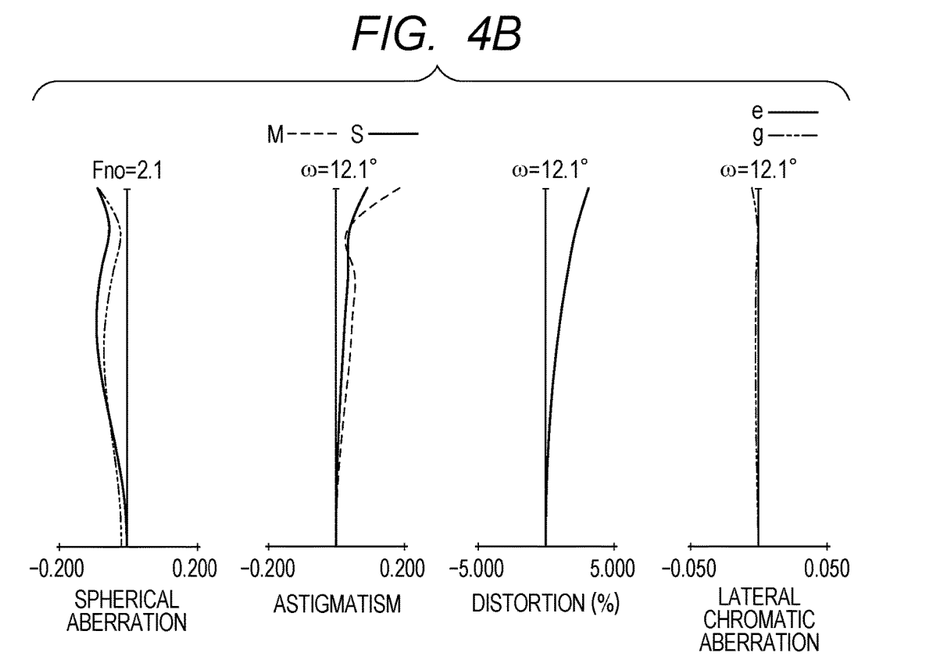
FIG. 4B is an aberration diagram of the zoom lens of Numerical Value Embodiment 2 at a focal length f=25.7 mm.
Figure 4C:
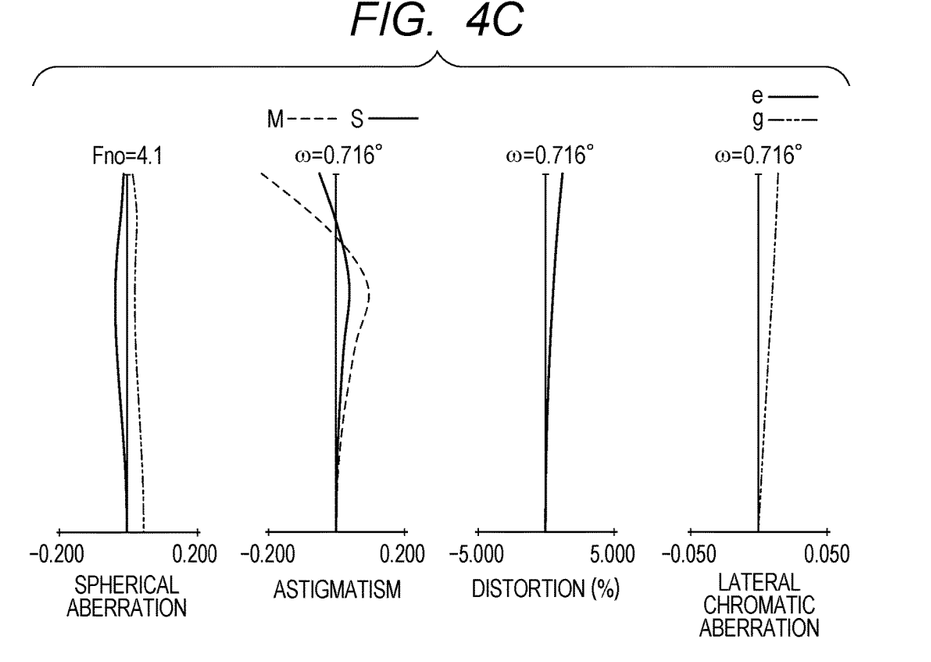
FIG. 4C is an aberration diagram of the zoom lens of Numerical Value Embodiment 2 at telephoto end.

FIGS. 4A, 4B, and 4C are aberration diagrams of the zoom lens of Numerical Value Embodiment 2 at the wide-angle end, a focal length f=25.7 mm, and the telephoto end, respectively. Note that the focal length f=25.7 mm is the focal length at which the distance between the second lens unit U2 and the third lens unit U3 is the minimum.

The lens configuration of each unit in Numerical Value Embodiment 2 is the same as that in Numerical Value Embodiment 1. Specifically, the units are configured as follows.

The first lens unit U1 has a positive refractive power and does not move for zooming. Part of the first lens unit U1 moves from the image side to the object side for focus adjustment from infinity to finite distance. The second lens unit U2 is a variator lens unit for zooming having a negative refractive power and moving to the image side during zooming from the wide-angle end (short focal distance end) to the telephoto end (long focal distance end). The third lens unit U3 and the fourth lens unit U4 have a negative refractive power and move during zooming. The relay lens unit UR does not move for zooming.

The lens configuration of each unit in Numerical Value Embodiment 2 is described. It is assumed below that lenses are arranged in order from the object side to the image side. The first lens unit U1 includes a negative lens and four positive lenses. The second lens unit U2 includes a negative lens, a negative lens, and a positive lens. The third lens unit U3 includes a negative lens. The fourth lens unit U4 includes a cemented lens of a negative lens and a positive lens. The relay lens unit UR includes a positive lens, a positive lens, a cemented lens of a positive lens and a negative lens, a cemented lens of a positive lens and a negative lens, a positive lens, a cemented lens of a negative lens and a positive lens, a cemented lens of a positive lens and a negative lens, and a positive lens.

Table 1 shows values of the conditional expressions used for Numerical Value Embodiment 2. Numerical Value Embodiment 2 satisfies Conditional Expressions (2) to (4). Thus, the present invention obtains an image pickup optical system that achieves not only favorable optical performance, but also a wide angle of view, a high power, and size and weight reduction.

Embodiment 3

A zoom lens of Numerical Value Embodiment 3 includes, in order from the object side to the image side, a first lens unit U1 having a positive refractive power, a second lens unit U2 for zooming having a negative refractive power, a third lens unit U3 for zooming having a negative refractive power, a fourth lens unit U4 for zooming having a negative refractive power, a fifth lens unit U5 having a positive refractive power and moving in conjunction with the second lens unit U2 to correct variation in the image plane caused by zooming, an aperture stop SP, a relay lens unit UR for image forming having a positive refractive power.

Figure 5:
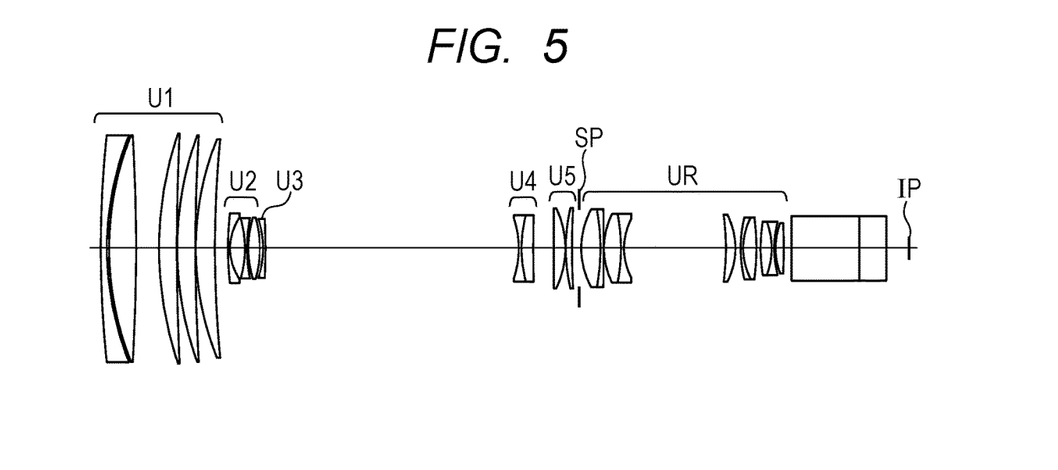
FIG. 5 is a lens sectional diagram of a zoom lens according to Numerical Value Embodiment 3 of the present invention at the wide-angle end, focusing at infinity.

FIG. 5 is a lens sectional diagram of the zoom lens of Numerical Value Embodiment 3 of the present invention at the wide-angle end, focusing at infinity.

Figure 6A:
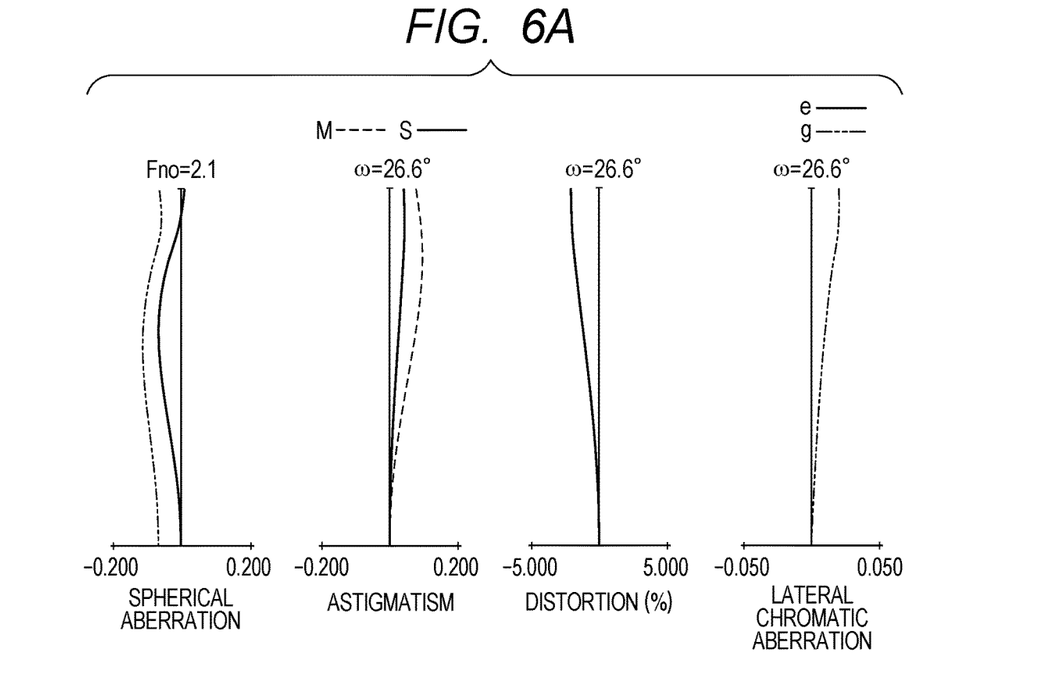
FIG. 6A is an aberration diagram of the zoom lens of Numerical Value Embodiment 3 at the wide-angle end.
Figure 6B:
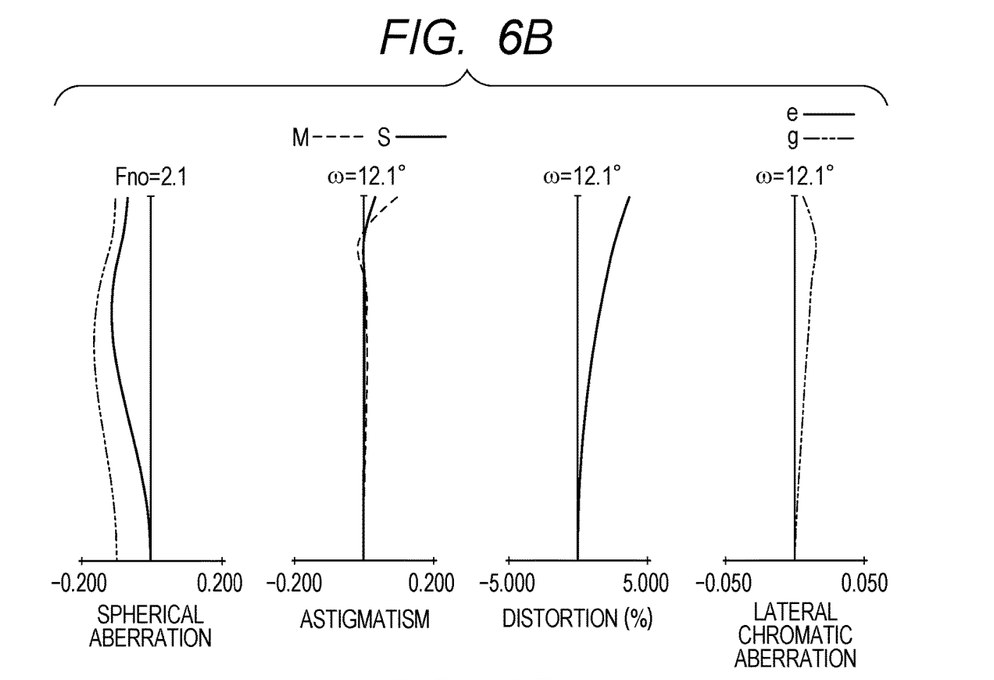
FIG. 6B is an aberration diagram of the zoom lens of Numerical Value Embodiment 3 at a focal length f=25.7 mm.
Figure 6C:
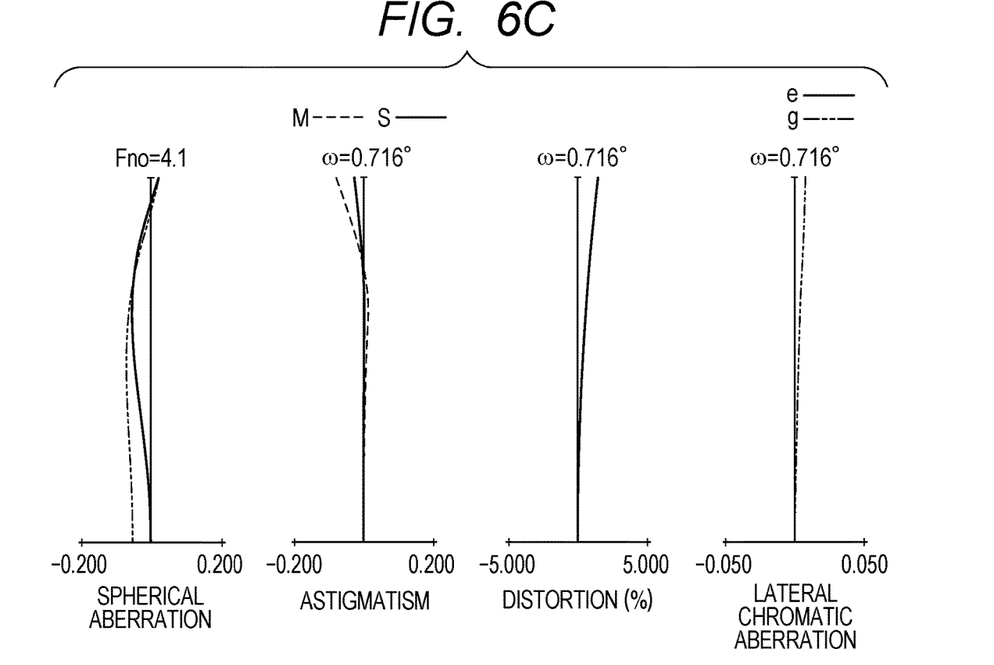
FIG. 6C is an aberration diagram of the zoom lens of Numerical Value Embodiment 3 at the telephoto end.

FIGS. 6A, 6B, and 6C are aberration diagrams of the zoom lens of Numerical Value Embodiment 3 at the wide-angle end, a focal length f=25.7 mm, and the telephoto end, respectively. Note that the focal length f=25.7 mm is the focal length at which the distance between the second lens unit U2 and the third lens unit U3 is the minimum.

Next, the lens configuration of each unit in Numerical Value Embodiment 3 is described. The first lens unit U1 includes a negative lens and four positive lenses. The second lens unit U2 includes a negative lens, a negative lens, and a positive lens. The third lens unit U3 includes a negative lens. The fourth lens unit U4 includes a cemented lens of a negative lens and a positive lens. The fifth lens unit U5 includes a positive lens and a positive lens. The relay lens unit UR includes a cemented lens of a positive lens and a negative lens, a cemented lens of a positive lens and a negative lens, a positive lens, a cemented lens of a negative lens and a positive lens, a cemented lens of a positive lens and a negative lens, and a positive lens.

Table 1 shows values of the conditional expressions used for Numerical Value Embodiment 3. Numerical Value Embodiment 3 satisfies Conditional Expressions (2) to (4). Thus, the present invention obtains an image pickup optical system that achieves not only favorable optical performance, but also a wide angle of view, a high power, and size and weight reduction.

An additional aspect of the present invention defines that the third lens unit U3 moves only to the image side when zooming from the wide-angle end to the telephoto end. If the third lens unit U3 moves along a locus directed to the object side, variation in aberrations in that zoom range increases to such an extreme extent that it is difficult to correct them. When third lens unit U3 maintains an appropriate distance from the second lens unit U2 in the entire zoom range, aberrations can be corrected favorably in the entire zoom range.

An additional mode of the present invention defines that the second lens unit U2 includes one or more negative lenses and one or more positive lenses. This enables favorable correction for chromatic aberration at the telephoto end.

An additional embodiment of the present invention defines that the third lens unit U3 as of a single negative lens. This enables reduction in the weight of the units that move during zooming, enabling a driving mechanism to perform a proper zoom operation.

An additional mode of the present embodiment defines that focusing is performed by a lens in the first lens unit U1. Thus, the amount of extension upon focusing is constant at any focal length zoom position, which allows simplification of the driving mechanism.

In the following numerical value embodiments, "i" indicates the ordinal number of a surface from the object side, "ri" is the radius of curvature of the i-th surface from the object side, "di" is the distance between the i-th surface and the (i+1)-th surface, and "ndi" and "vdi" are respectively the refractive index and the Abbe number, for d-line (587.6 nm), of an optical member between the i-th surface and the (i+1)-th surface. Note that an Abbe number vd is expressed by:

$$vd=(nd-1)/(nF-nC)$$

where nd, nF, and nC are the refractive indices for d-line, F-line (486.1 nm), and C-line (656.3 nm), respectively.

With an X axis being the optical-axis direction, an H axis being perpendicular to the optical axis, a light travelling direction being positive, "R" being a paraxial curvature radius, "k" being a conic constant, and "A3", "A4", "A5", "A6", "A7", "A8", "A9", "A10", "A11", "A12", "A13", "A14", "A15", and "A16" each being an aspherical coefficient, an aspherical shape is expressed as follows.

$$X = \frac{H^2/R}{1+\sqrt{1-(1+k)(H/R)^2}} + A4H^4 + A6H^6 + A8H^8 + A10H^{10} + A12H^{12} + A14H^{14} + A16H^{16} \\ A3H^3 + A5H^5 + A7H^7 + A9H^9 + A11H^{11} + A13H^{13} + A15H^{15}$$ [Expression 1]

Further, for example, "e-Z" indicates "×10$^{-Z}$". Aspheric surfaces are asterisked.

Each numerical value embodiment shows the distances between lens units at the wide-angle end, the focal length f=25.7 mm, the focal length f=40.0 mm (fw×Z$^{0.35}$), the focal length f=44.7 mm (fw×Z$^{0.38}$), and the telephoto end. "Z" denotes a zoom ratio, and fw denotes the focal length of the zoom lens at the wide-angle end. The focal length f=25.7 mm is the focal length at which the distance between the second lens unit U2 and the third lens unit U3 is minimum.

[Numerical Value Embodiment 1]
[unit: mm]

Surface data

| i | ri | di | ndi | vdi | Effective diameter |
|---|---|---|---|---|---|
| 1 | 832.322 | 3.00 | 1.80610 | 40.9 | 112.51 |
| 2 | 154.877 | 1.07 | | | 109.34 |
| 3 | 155.973 | 14.63 | 1.43387 | 95.1 | 109.42 |
| 4 | −466.892 | 11.15 | | | 109.17 |

[Numerical Value Embodiment 1]
[unit: mm]

| | | | | |
|---|---|---|---|---|
| 5 | 164.744 | 10.08 | 1.43387 | 95.1 | 109.24 |
| 6 | 1780.522 | 0.20 | | | 108.99 |
| 7 | 153.969 | 9.40 | 1.43387 | 95.1 | 107.15 |
| 8 | 770.543 | 0.20 | | | 106.56 |
| 9 | 148.513 | 8.20 | 1.43387 | 95.1 | 103.04 |
| 10 | 441.003 | (variable) | | | 101.98 |
| 11 | 132.209 | 1.00 | 1.88300 | 40.8 | 34.76 |
| 12 | 30.444 | 7.00 | | | 30.97 |
| 13 | −70.870 | 0.90 | 1.81600 | 46.6 | 30.15 |
| 14 | 53.869 | 0.70 | | | 29.41 |
| 15 | 41.092 | 6.30 | 1.80810 | 22.8 | 29.66 |
| 16 | −54.904 | (variable) | | | 29.27 |
| 17 | −38.653 | 1.10 | 1.81600 | 46.6 | 27.37 |
| 18 | 125.895 | (variable) | | | 26.77 |
| 19 | −48.116 | 1.30 | 1.71700 | 47.9 | 27.96 |
| 20 | 57.301 | 4.34 | 1.84649 | 23.9 | 29.87 |
| 21 | 369.461 | (variable) | | | 30.63 |
| 22 (stop) | ∞ | 4.05 | | | 36.53 |
| 23 | 226.671 | 6.76 | 1.60738 | 56.8 | 39.62 |
| 24 | −52.362 | 0.15 | | | 40.19 |
| 25 | 3180.721 | 3.29 | 1.51823 | 58.9 | 40.17 |
| 26 | −125.098 | 0.35 | | | 40.16 |
| 27 | 39.069 | 9.43 | 1.48749 | 70.2 | 38.85 |
| 28 | −98.064 | 1.50 | 1.83400 | 37.2 | 37.68 |
| 29 | −2415.030 | 0.15 | | | 36.69 |
| 30 | 36.731 | 8.31 | 1.48749 | 70.2 | 34.08 |
| 31 | −86.274 | 1.50 | 1.88300 | 40.8 | 32.16 |
| 32 | 30.301 | 50.00 | | | 29.02 |
| 33 | −120.629 | 4.64 | 1.51742 | 52.4 | 31.53 |
| 34 | −35.365 | 2.54 | | | 31.77 |
| 35 | 63.076 | 1.20 | 1.78590 | 44.2 | 28.99 |
| 36 | 31.790 | 6.50 | 1.51742 | 52.4 | 27.89 |
| 37 | −109.650 | 2.01 | | | 27.14 |
| 38 | 76.161 | 5.44 | 1.51742 | 52.4 | 24.73 |
| 39 | −36.256 | 1.20 | 1.83481 | 42.7 | 23.56 |
| 40 | 48.072 | 0.67 | | | 22.80 |
| 41 | 33.725 | 4.04 | 1.48749 | 70.2 | 22.94 |
| 42 | −819.930 | 3.80 | | | 22.61 |
| 43 | ∞ | 33.00 | 1.60859 | 46.4 | 30.00 |
| 44 | ∞ | 13.20 | 1.51680 | 64.2 | 30.00 |
| 45 | ∞ | (variable) | | | 30.00 |
| Image plane | ∞ | | | | |

Various data
Zoom ratio 40.00

| | | | | | |
|---|---|---|---|---|---|
| Focal length | 11.00 | 25.70 | 40.01 | 44.69 | 440.00 |
| F-NUMBER | 2.10 | 2.10 | 2.10 | 2.10 | 4.10 |
| Half angle of view | 26.57 | 12.08 | 7.83 | 7.02 | 0.72 |
| Image height | 5.50 | 5.50 | 5.50 | 5.50 | 5.50 |
| Total lens length | 400.63 | 400.63 | 400.63 | 400.63 | 400.63 |
| BF | 10.89 | 10.89 | 10.89 | 10.89 | 10.89 |
| d10 | 7.58 | 58.57 | 76.68 | 79.90 | 121.68 |
| d16 | 2.23 | 2.15 | 2.73 | 4.61 | 4.53 |
| d18 | 125.91 | 68.78 | 46.79 | 40.59 | 16.30 |
| d21 | 9.71 | 15.93 | 19.23 | 20.33 | 2.92 |
| d45 | 10.89 | 10.89 | 10.89 | 10.89 | 10.89 |
| Entrance pupil position | 89.63 | 245.59 | 370.83 | 408.54 | 2360.12 |
| Exit pupil position | 604.17 | 604.17 | 604.17 | 604.17 | 604.17 |
| Front principal point position | 100.84 | 272.40 | 413.54 | 456.59 | 3126.44 |
| Rear principal point position | −0.11 | −14.81 | −29.12 | −33.80 | −429.11 |

Zoom lens unit data

| Unit | Start surface | Focal length | Lens structure length | Front principal point position | Rear principal point position |
|---|---|---|---|---|---|
| 1 | 1 | 161.84 | 57.93 | 32.27 | −10.55 |
| 2 | 11 | −99.72 | 15.90 | −13.94 | −30.95 |
| 3 | 17 | −35.95 | 1.10 | 0.14 | −0.46 |
| 4 | 19 | −66.60 | 5.64 | 0.36 | −2.72 |
| 5 | 22 | 89.57 | 163.74 | 100.93 | −192.15 |

Single lens data

| Lens | Start surface | Focal length |
|---|---|---|
| 1 | 1 | −235.16 |
| 2 | 3 | 270.72 |
| 3 | 5 | 416.59 |
| 4 | 7 | 440.34 |
| 5 | 9 | 510.47 |
| 6 | 11 | −44.74 |
| 7 | 13 | −37.20 |
| 8 | 15 | 29.66 |
| 9 | 17 | −35.95 |
| 10 | 19 | −36.11 |
| 11 | 20 | 78.83 |
| 12 | 23 | 70.38 |
| 13 | 25 | 231.40 |
| 14 | 27 | 58.44 |
| 15 | 28 | −121.82 |
| 16 | 30 | 53.86 |
| 17 | 31 | −25.10 |
| 18 | 33 | 94.50 |
| 19 | 35 | −82.52 |
| 20 | 36 | 48.17 |
| 21 | 38 | 48.05 |
| 22 | 39 | −24.46 |
| 23 | 41 | 66.33 |
| 24 | 43 | 0.00 |
| 25 | 44 | 0.00 |

[Numerical Value Embodiment 2]
[unit: mm]

Surface data

| i | ri | di | ndi | vdi | Effective diameter |
|---|---|---|---|---|---|
| 1 | 435.774 | 3.00 | 1.80610 | 40.9 | 107.32 |
| 2 | 142.557 | 1.07 | | | 106.21 |
| 3 | 143.028 | 12.56 | 1.43387 | 95.1 | 106.77 |
| 4 | −2022.016 | 11.15 | | | 106.87 |
| 5 | 186.800 | 9.04 | 1.43387 | 95.1 | 108.38 |
| 6 | 1233.605 | 0.20 | | | 108.10 |
| 7 | 163.476 | 9.16 | 1.43387 | 95.1 | 106.91 |
| 8 | 781.246 | 0.20 | | | 106.30 |
| 9 | 133.286 | 10.41 | 1.43387 | 95.1 | 102.92 |
| 10 | 688.440 | (variable) | | | 101.90 |
| 11 | 121.041 | 1.00 | 1.88300 | 40.8 | 31.11 |
| 12 | 22.894 | 8.41 | | | 27.13 |
| 13 | −32.616 | 0.90 | 1.81600 | 46.6 | 26.63 |
| 14 | 99.773 | 0.70 | | | 27.43 |
| 15 | 63.848 | 4.94 | 1.80810 | 22.8 | 28.19 |
| 16 | −54.904 | (variable) | | | 28.32 |
| 17 | −38.653 | 1.10 | 1.81600 | 46.6 | 25.59 |

[Numerical Value Embodiment 2]
[unit: mm]

| | | | | | |
|---|---|---|---|---|---|
| 18 | −57.093 | (variable) | | | 25.88 |
| 19 | −48.209 | 1.30 | 1.71700 | 47.9 | 28.19 |
| 20 | 57.235 | 3.25 | 1.84649 | 23.9 | 30.13 |
| 21 | 362.059 | (variable) | | | 30.57 |
| 22 (stop) | ∞ | 4.05 | | | 36.87 |
| 23 | 226.671 | 6.76 | 1.60738 | 56.8 | 40.00 |
| 24 | −52.362 | 0.15 | | | 40.55 |
| 25 | 3180.721 | 3.29 | 1.51823 | 58.9 | 40.53 |
| 26 | −125.098 | 0.35 | | | 40.51 |
| 27 | 39.069 | 9.43 | 1.48749 | 70.2 | 39.17 |
| 28 | −98.064 | 1.50 | 1.83400 | 37.2 | 38.04 |
| 29 | −2415.030 | 0.15 | | | 37.02 |
| 30 | 36.731 | 8.31 | 1.48749 | 70.2 | 34.34 |
| 31 | −86.274 | 1.50 | 1.88300 | 40.8 | 32.48 |
| 32 | 30.301 | 50.00 | | | 29.27 |
| 33 | −120.629 | 4.64 | 1.51742 | 52.4 | 31.85 |
| 34 | −35.365 | 2.54 | | | 32.08 |
| 35 | 63.076 | 1.20 | 1.78590 | 44.2 | 29.23 |
| 36 | 31.790 | 6.50 | 1.51742 | 52.4 | 28.11 |
| 37 | −109.650 | 2.01 | | | 27.38 |
| 38 | 76.161 | 5.44 | 1.51742 | 52.4 | 24.92 |
| 39 | −36.256 | 1.20 | 1.83481 | 42.7 | 23.75 |
| 40 | 48.072 | 0.67 | | | 22.97 |
| 41 | 33.725 | 4.04 | 1.48749 | 70.2 | 23.10 |
| 42 | −1156.136 | 3.80 | | | 22.76 |
| 43 | ∞ | 33.00 | 1.60859 | 46.4 | 30.00 |
| 44 | ∞ | 13.20 | 1.51680 | 64.2 | 30.00 |
| 45 | ∞ | (variable) | | | 30.00 |
| Image plane | ∞ | | | | |

Various data
Zoom ratio 40.00

| | | | | | |
|---|---|---|---|---|---|
| Focal length | 11.00 | 25.70 | 40.01 | 44.69 | 440.00 |
| F-NUMBER | 2.10 | 2.10 | 2.10 | 2.10 | 4.10 |
| Half angle of view | 26.57 | 12.08 | 7.83 | 7.02 | 0.72 |
| Image height | 5.50 | 5.50 | 5.50 | 5.50 | 5.50 |
| Total lens length | 392.43 | 392.43 | 392.43 | 392.43 | 392.43 |
| BF | 11.23 | 11.23 | 11.23 | 11.23 | 11.23 |
| d10 | 4.98 | 56.37 | 75.61 | 79.70 | 123.57 |
| d16 | 10.00 | 1.01 | 3.00 | 6.86 | 5.00 |
| d18 | 113.88 | 65.92 | 41.33 | 32.13 | 8.65 |
| d21 | 10.21 | 15.76 | 19.13 | 20.37 | 1.85 |
| d45 | 11.23 | 11.23 | 11.23 | 11.23 | 11.23 |
| Entrance pupil position | 81.51 | 225.12 | 344.05 | 381.44 | 2144.80 |
| Exit pupil position | 683.35 | 683.35 | 683.35 | 683.35 | 683.35 |
| Front principal point position | 92.69 | 251.80 | 386.44 | 429.10 | 2872.84 |
| Rear principal point position | 0.23 | −14.47 | −28.78 | −33.46 | −428.77 |

Zoom lens unit data

| Unit | Start surface | Focal length | Lens structure length | Front principal point position | Rear principal point position |
|---|---|---|---|---|---|
| 1 | 1 | 161.84 | 56.79 | 30.57 | −11.98 |
| 2 | 11 | −29.26 | 15.95 | −0.40 | −14.50 |
| 3 | 17 | −149.94 | 1.10 | −1.30 | −1.92 |
| 4 | 19 | −66.60 | 4.55 | 0.28 | −2.22 |
| 5 | 22 | 88.50 | 163.74 | 98.48 | −190.25 |

Single lens data

| Lens | Start surface | Focal length |
|---|---|---|
| 1 | 1 | −262.51 |
| 2 | 3 | 307.65 |
| 3 | 5 | 504.78 |
| 4 | 7 | 473.17 |
| 5 | 9 | 377.86 |
| 6 | 11 | −31.94 |
| 7 | 13 | −29.88 |
| 8 | 15 | 36.85 |
| 9 | 17 | −149.94 |
| 10 | 19 | −36.13 |
| 11 | 20 | 79.14 |
| 12 | 23 | 70.38 |
| 13 | 25 | 231.40 |
| 14 | 27 | 58.44 |
| 15 | 28 | −121.82 |
| 16 | 30 | 53.86 |
| 17 | 31 | −25.10 |
| 18 | 33 | 94.50 |
| 19 | 35 | −82.52 |
| 20 | 36 | 48.17 |
| 21 | 38 | 48.05 |
| 22 | 39 | −24.46 |
| 23 | 41 | 67.07 |
| 24 | 43 | 0.00 |
| 25 | 44 | 0.00 |

[Numerical Value Embodiment 3]
[unit: mm]

Surface data

| i | ri | di | ndi | vdi | Effective diameter |
|---|---|---|---|---|---|
| 1 | 523.544 | 3.00 | 1.80610 | 40.9 | 107.32 |
| 2 | 145.711 | 1.07 | | | 106.37 |
| 3 | 146.714 | 13.21 | 1.43387 | 95.1 | 106.93 |
| 4 | −896.172 | 11.15 | | | 107.07 |
| 5 | 172.518 | 8.70 | 1.43387 | 95.1 | 108.71 |
| 6 | 1145.760 | 0.20 | | | 108.54 |
| 7 | 160.149 | 8.84 | 1.43387 | 95.1 | 107.15 |
| 8 | 901.965 | 0.20 | | | 106.76 |
| 9 | 140.899 | 9.37 | 1.43387 | 95.1 | 103.19 |
| 10 | 550.140 | (variable) | | | 102.15 |
| 11 | 147.529 | 1.00 | 1.88300 | 40.8 | 32.41 |
| 12 | 26.125 | 7.35 | | | 28.60 |
| 13 | −49.972 | 0.90 | 1.81600 | 46.6 | 28.03 |
| 14 | 71.463 | 0.70 | | | 28.01 |
| 15 | 50.898 | 5.70 | 1.80810 | 22.8 | 28.44 |
| 16 | −53.095 | (variable) | | | 28.29 |
| 17 | −40.722 | 1.10 | 1.81600 | 46.6 | 27.39 |
| 18 | −345.238 | (variable) | | | 27.36 |
| 19 | −45.092 | 1.30 | 1.71700 | 47.9 | 27.61 |
| 20 | 60.925 | 5.77 | 1.84649 | 23.9 | 29.55 |
| 21 | 713.034 | (variable) | | | 30.79 |
| 22 | −17109.957 | 5.66 | 1.60738 | 56.8 | 36.92 |
| 23 | −44.192 | 0.15 | | | 37.48 |
| 24 | 83.857 | 3.05 | 1.51823 | 58.9 | 37.78 |
| 25 | 354.935 | (variable) | | | 37.60 |
| 26 (stop) | ∞ | 1.00 | | | 37.12 |
| 27 | 39.069 | 9.43 | 1.48749 | 70.2 | 36.36 |
| 28 | −98.064 | 1.50 | 1.83400 | 37.2 | 34.92 |
| 29 | −2415.030 | 0.15 | | | 34.11 |
| 30 | 36.731 | 8.31 | 1.48749 | 70.2 | 32.09 |
| 31 | −86.274 | 1.50 | 1.88300 | 40.8 | 29.91 |
| 32 | 30.301 | 50.00 | | | 27.34 |

-continued

[Numerical Value Embodiment 3]
[unit: mm]

| | | | | |
|---|---|---|---|---|
| 33 | −120.629 | 4.64 | 1.51742 52.4 | 30.83 |
| 34 | −35.365 | 2.54 | | 31.11 |
| 35 | 63.076 | 1.20 | 1.78590 44.2 | 28.68 |
| 36 | 31.790 | 6.50 | 1.51742 52.4 | 27.65 |
| 37 | −109.650 | 2.01 | | 26.95 |
| 38 | 76.161 | 5.44 | 1.51742 52.4 | 24.71 |
| 39 | −36.256 | 1.20 | 1.83481 42.7 | 23.54 |
| 40 | 48.072 | 0.67 | | 22.88 |
| 41 | 33.725 | 4.04 | 1.48749 70.2 | 23.07 |
| 42 | −213.198 | 3.80 | | 22.82 |
| 43 | ∞ | 33.00 | 1.60859 46.4 | 30.00 |
| 44 | ∞ | 13.20 | 1.51680 64.2 | 30.00 |
| 45 | ∞ | (variable) | | 30.00 |
| Image plane | ∞ | | | |

Various data
Zoom ratio 40.00

| | | | | | |
|---|---|---|---|---|---|
| Focal length | 11.00 | 25.70 | 40.01 | 44.69 | 440.00 |
| F-NUMBER | 2.10 | 2.10 | 2.10 | 2.10 | 4.10 |
| Half angle of view | 26.57 | 12.08 | 7.83 | 7.02 | 0.72 |
| Image height | 5.50 | 5.50 | 5.50 | 5.50 | 5.50 |
| Total lens length | 395.36 | 395.36 | 395.36 | 395.36 | 395.36 |
| BF | 11.22 | 11.22 | 11.22 | 11.22 | 11.22 |
| d10 | 6.34 | 57.48 | 76.10 | 79.62 | 123.25 |
| d16 | 1.79 | 0.81 | 1.77 | 3.33 | 4.12 |
| d18 | 123.92 | 66.14 | 42.89 | 35.94 | 13.49 |
| d21 | 10.04 | 16.19 | 19.64 | 20.83 | 1.79 |
| d25 | 3.50 | 4.98 | 5.19 | 5.88 | 2.94 |
| d45 | 11.22 | 11.22 | 11.22 | 11.22 | 11.22 |
| Entrance pupil position | 83.89 | 232.05 | 352.49 | 386.61 | 2553.50 |
| Exit pupil position | 503.98 | 503.98 | 503.98 | 503.98 | 503.98 |
| Front principal point position | 95.13 | 259.09 | 395.74 | 435.35 | 3386.39 |
| Rear principal point position | 0.22 | −14.48 | −28.78 | −33.47 | −428.78 |

Zoom lens unit data

| Unit | Start surface | Focal length | Lens structure length | Front principal point position | Rear principal point position |
|---|---|---|---|---|---|
| 1 | 1 | 161.84 | 55.74 | 30.60 | −11.03 |
| 2 | 11 | −50.48 | 15.65 | −5.15 | −20.09 |
| 3 | 17 | −56.38 | 1.10 | −0.08 | −0.69 |
| 4 | 19 | −66.60 | 7.07 | 0.20 | −3.65 |
| 5 | 22 | 53.89 | 8.86 | 3.40 | −2.26 |
| 6 | 26 | 75.75 | 150.13 | 87.83 | −46.51 |

Single lens data

| Lens | Start surface | Focal length |
|---|---|---|
| 1 | 1 | −249.91 |
| 2 | 3 | 290.97 |
| 3 | 5 | 465.67 |
| 4 | 7 | 446.07 |
| 5 | 9 | 432.47 |
| 6 | 11 | −35.88 |

-continued

[Numerical Value Embodiment 3]
[unit: mm]

| | | |
|---|---|---|
| 7 | 13 | −35.74 |
| 8 | 15 | 32.63 |
| 9 | 17 | −56.38 |
| 10 | 19 | −35.78 |
| 11 | 20 | 77.61 |
| 12 | 22 | 72.63 |
| 13 | 24 | 210.21 |
| 14 | 27 | 58.44 |
| 15 | 28 | −121.82 |
| 16 | 30 | 53.86 |
| 17 | 31 | −25.10 |
| 18 | 33 | 94.50 |
| 19 | 35 | −82.52 |
| 20 | 36 | 48.17 |
| 21 | 38 | 48.05 |
| 22 | 39 | −24.46 |
| 23 | 41 | 59.85 |
| 24 | 43 | 0.00 |
| 25 | 44 | 0.00 |

TABLE 1 values of the conditional expressions
used for Numerical Value Embodiments 1 to 3

| | | Numerical Value Embodiment | | |
|---|---|---|---|---|
| Conditional Expression | | 1 | 2 | 3 |
| (2) | L2min/L2w | 0.96 | 0.10 | 0.45 |
| (3) | |f2/f3| | 2.77 | 0.20 | 0.90 |
| (4) | |f1/f2| | 1.62 | 5.53 | 3.21 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-227543, filed Nov. 24, 2016, which is hereby incorporated by reference herein in its entirety.

What is claimed is:

1. A zoom lens comprising, in order from an object side to an image side:
   a first lens unit having a positive refractive power and configured not to move for zooming;
   a second lens unit having a negative refractive power and configured to move for zooming;
   a third lens unit having a negative refractive power and configured to move for zooming;
   a fourth lens unit having a negative refractive power and configured to move for zooming; and
   a relay lens unit having a positive refractive power and configured not to move for zooming, wherein
   the second lens unit is configured to move to the image side from a wide-angle end to a telephoto end,
   a distance between the second lens unit and the third lens unit is narrower at a zoom state between the wide-angle end and the telephoto end than that at the wide-angle end, and
   a conditional expression $0.05 < L2\,min/L2w < 0.98$ is satisfied where L2 min is a minimum distance between the second lens unit and the third lens unit in a zoom range from the wide-angle end to a zoom state corresponding to a focal length fx, and L2w is a distance between the second lens unit and the third lens unit at the wide-angle end, wherein the focal length fx is defined by an expression $$fx = fw \times Z^{0.38},$$

where fw is a focal length of the zoom lens at the wide-angle end, and Z is a zoom ratio of the zoom lens.

2. The zoom lens according to claim 1, wherein a conditional expression:

$$0.1 < |f2/f3| < 4.0$$

is satisfied where f2 is a focal length of the second lens unit, and f3 is a focal length of the third lens unit.

3. The zoom lens according to claim 1, wherein a conditional expression:

$$1.2 < |f1/f2| < 7.0$$

is satisfied where f1 is a focal length of the first lens unit, and f2 is a focal length of the second lens unit.

4. The zoom lens according to claim 1, wherein the third lens unit is configured to move only to the image side from the wide-angle end to the telephoto end.

5. The zoom lens according to claim 1, wherein the second lens unit includes a negative lens and a positive lens.

6. The zoom lens according to claim 1 wherein the third lens unit consists of a negative lens.

7. The zoom lens according to claim 1, wherein focusing is performed by moving a part of the first lens unit.

8. An image pickup apparatus comprising:
a zoom lens comprising, in order from an object side to an image side:
    a first lens unit having a positive refractive power and configured not to move for zooming;
    a second lens unit having a negative refractive power and configured to move for zooming;
    a third lens unit having a negative refractive power and configured to move for zooming;
    a fourth lens unit having a negative refractive power and configured to move for zooming; and
    a relay lens unit having a positive refractive power and configured not to move for zooming, wherein
    the second lens unit is configured to move to the image side from a wide-angle end to a telephoto end,
    a distance between the second lens unit and the third lens unit is narrower at a zoom state between the wide-angle end and the telephoto end than that at the wide-angle end, and
    a conditional expression $$0.05 < L2\min/L2w < 0.98$$

is satisfied where L2 min is a minimum distance between the second lens unit and the third lens unit in a zoom range from the wide-angle end to a zoom state corresponding to a focal length fx, and L2w is a distance between the second lens unit and the third lens unit at the wide-angle end, wherein the focal length fx is defined by an expression $$fx = fw \times Z^{0.38},$$

where fw is a focal length of the zoom lens at the wide-angle end, and Z is a zoom ratio of the zoom lens; and
    an image pickup element configured to pick up an image formed by the zoom lens.

\* \* \* \* \*